United States Patent [19]
Kobayashi

[11] Patent Number: 5,317,785
[45] Date of Patent: Jun. 7, 1994

[54] HINGE MECHANISM FOR FOLDABLE ELECTRONIC APPARATUS

[75] Inventor: Fumiyuki Kobayashi, Tokyo, Japan
[73] Assignee: NEC Corporation, Tokyo, Japan
[21] Appl. No.: 954,348
[22] Filed: Sep. 30, 1992

[30] Foreign Application Priority Data

Sep. 30, 1991 [JP] Japan .......................... 3-078901[U]

[51] Int. Cl.⁵ ........................................ E05D 11/10
[52] U.S. Cl. ............................................ 16/329; 16/322
[58] Field of Search .............. 16/328, 329, 330, 321, 16/322, 324; 248/476, 477, 478

[56] References Cited

U.S. PATENT DOCUMENTS

| | | | |
|---|---|---|---|
| 3,874,029 | 4/1975 | McCullough | 16/329 |
| 4,623,115 | 11/1986 | Brester | 248/477 |
| 4,822,965 | 4/1989 | Hyogo et al. | 16/330 |
| 5,109,571 | 5/1992 | Ohshima et al. | 16/330 |
| 5,185,790 | 2/1993 | Mischneko | 16/334 |

*Primary Examiner*—Paula A. Bradley
*Assistant Examiner*—Chuck Y. Mah

[57] ABSTRACT

A hinge mechanism for a foldable electronic apparatus having a first and a second casing. A first and a second cylindrical hinge are provided on the first and second casings, respectively. The second hinge is formed with lugs each having two contact faces having angles $\alpha$ and $\beta$ (smaller than $\alpha$). A locking member is received in the first hinge and provided with recesses each contacting one of the lugs at either of the angles $\alpha$ and $\beta$, depending on the direction of rotation, i.e., the folding direction or the unfolding direction.

2 Claims, 5 Drawing Sheets $(\alpha > \beta)$

HINGE MECHANISM FOR FOLDABLE ELECTRONIC APPARATUS

BACKGROUND OF THE INVENTION

The present invention relates to the structure of a foldable electronic apparatus and, more particularly, to a hinge mechanism for a hand-held radio communication apparatus.

A hand-held radio communication apparatus, e.g., a hand-held mobile telephone is one of portable electronic apparatuses extensively used today. For miniaturization, it is a common practice with such a hand-held radio communication apparatus to divide the casing thereof into two and connect the two casing parts by a hinge mechanism. In this configuration, the casing parts are rotatable about the hinge mechanism toward and away from each other, i.e., the apparatus is foldable. The casing parts are locked in a position where they are spaced apart by a predetermined angle by lugs and recesses included in the hinge mechanism. To unlock the casing parts, a force greater than the bias of a spring also included in the hinge mechanism is exerted on the casing parts. The prerequisite with such a mechanism is that the bias of the spring be greater than the predetermined force associated with the predetermined angle, so that the mechanism may rotate beyond the predetermined angle only when a force greater than the predetermined force acts thereon. This brings about a problem that the apparatus cannot be folded or unfolded from or to the predetermined angle unless a force overcoming the bias of the spring is exerted. Should use be made of a spring exerting a relatively small bias to eliminate the above problem, the casing parts locked at the predetermined angle would be easily unlocked by a small effort.

SUMMARY OF THE INVENTION

It is therefore an object of the present invention to provide a hinge mechanism for a foldable electronic apparatus which is easy to operate.

It is another object of the present invention to provide a hinge mechanism for a foldable electronic apparatus which protects the apparatus from damage.

A hinge mechanism for rotatably connecting a first and a second casing of a foldable electronic apparatus of the present invention comprises a first hinge provided on the first casing and having a first engaging portion, and a second hinge provided on the second casing and having a second engaging portion mating with the first engaging portion of the first hinge such that the first and second casings are locked in positions spaced apart by a predetermined angle from each other. The second engaging portion mates with the first engaging portion in a condition which differs from one direction of rotation to the other direction of rotation of the first and second casings.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
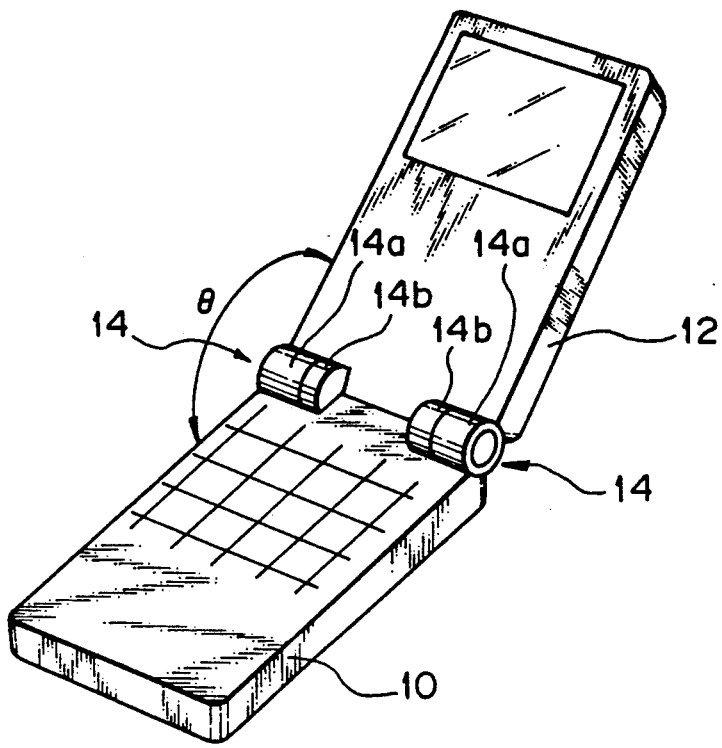
FIG. 1 is a perspective view of a foldable electronic apparatus to which the present invention is applicable.

Referring to FIG. 1 of the drawings, a foldable electronic apparatus to which the present invention is applicable is shown and implemented as a hand-held mobile telephone by way of example. As shown, the telephone has a first casing 10 and a second casing 12 which are rotatably connected together by a pair of hinge mechanisms 14 having an identical configuration. The hinge mechanisms 14 each has a cylindrical first hinge 14a connected to the casing 10, and a cylindrical second hinge 14b connected to the casing 12. The hinges 14a and 14b are configured such that the casings 10 and 12 are locked in a position where they are spaced apart by a predetermined angle $\theta$.

Figure 2:
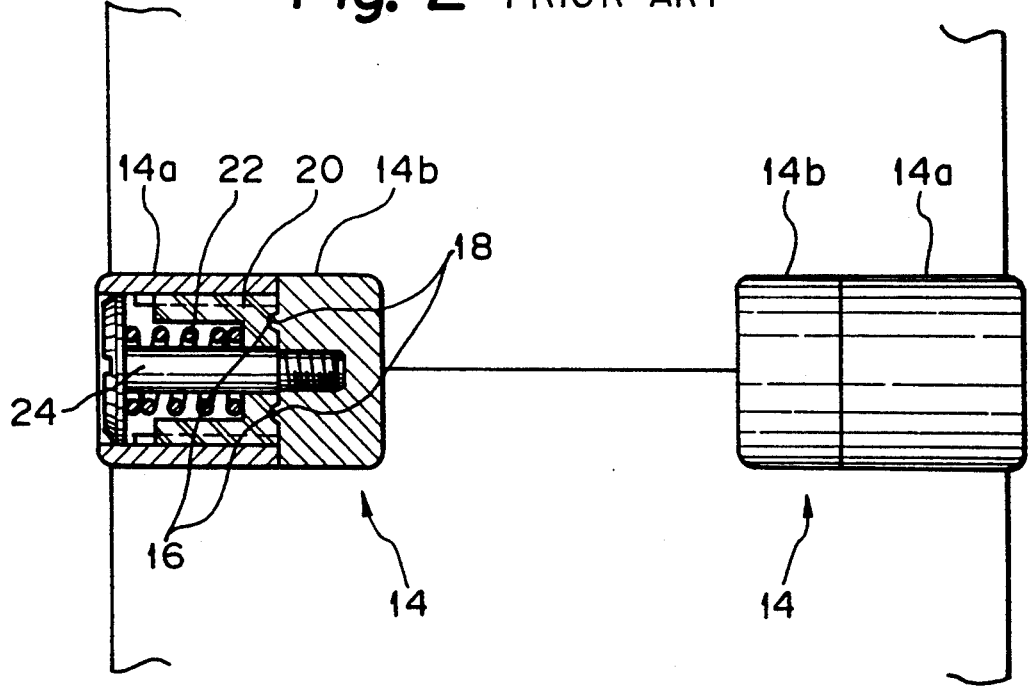
FIG. 2 is a sectional side elevation showing a conventional hinge mechanism.

FIG. 2 shows a conventional arrangement of the first and second hinges 14a and 14b. The hinge 14a is provided with semispherical recesses 16 on the end thereof which faces the hinge 14b. On the other hand, the hinge 14b is provided with semispherical lugs 18 on the end thereof which faces the hinge 14a, the lugs 18 mating with the recesses 16. More specifically, a cylindrical locking member 20 is received in the cylindrical hinge 14b and formed with the recesses 16 on the end thereof which faces the hinge 14b. A coil spring 22 is accommodated in the locking member 20 to constantly urge the member 20 against the hinge 14b via a screw 24. The problem with this kind of arrangement is that the bias of the spring 22 is difficult to set, as stated earlier.

A preferred embodiment of the hinge mechanism in accordance with the present invention which eliminates the above problem will be described hereinafter. In the embodiment, the same or similar constituents to the constituents of the mechanism shown in FIGS. 1 and 2 are designated by like reference numerals.

Figure 3:
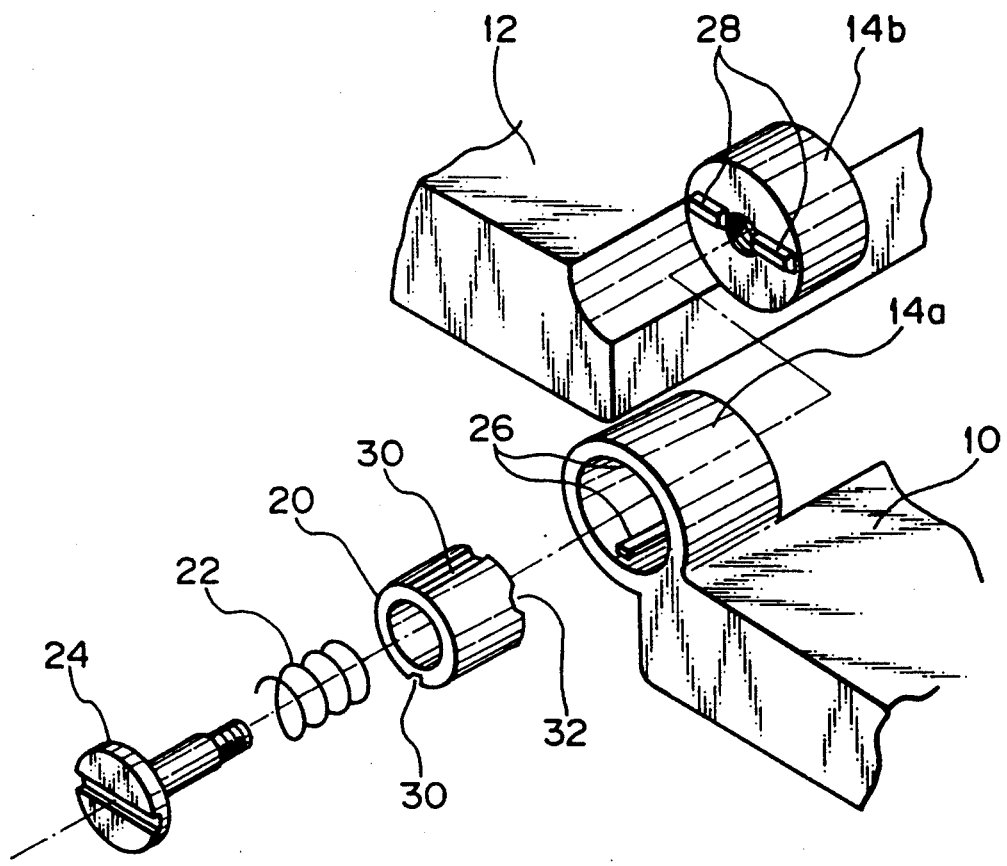
FIG. 3 is an exploded perspective view of a hinge mechanism embodying the present invention.
Figure 4B:
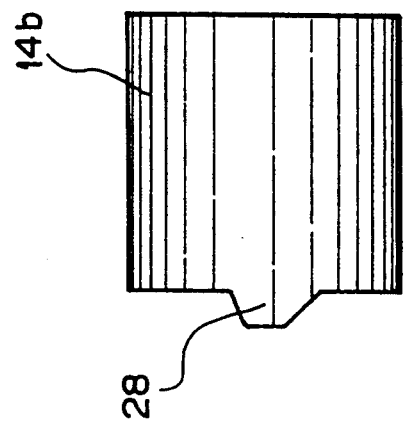
FIGS. 4B and 4C are side elevations showing the second hinge as viewed from opposite sides.
Figure 4A:
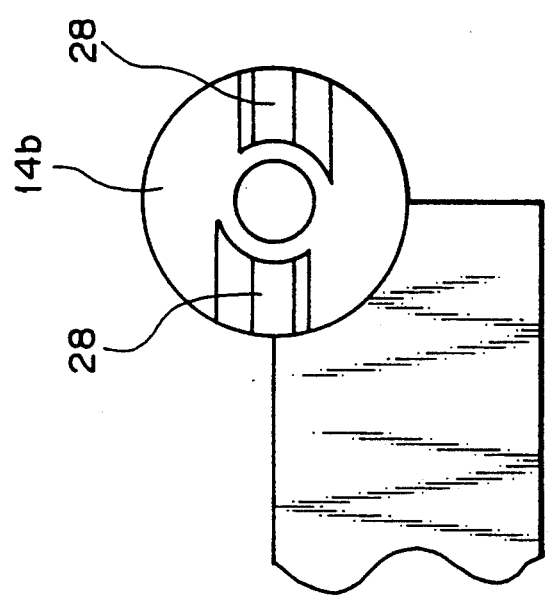
FIG. 4A is a front view showing a second hinge included in the embodiment in detail.
Figure 4C:
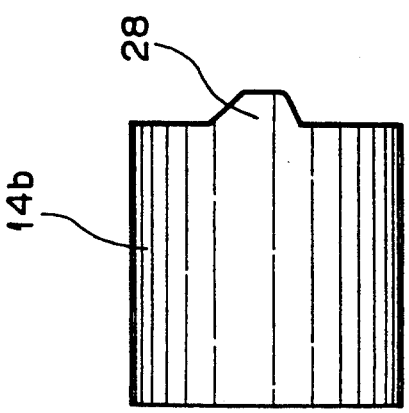
Figure 5B:
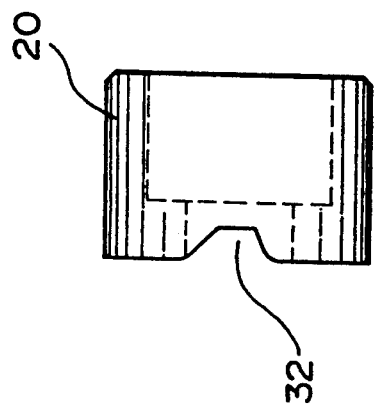
FIGS. 5B and 5C are side elevations of the locking member as viewed from opposite sides.
Figure 5A:
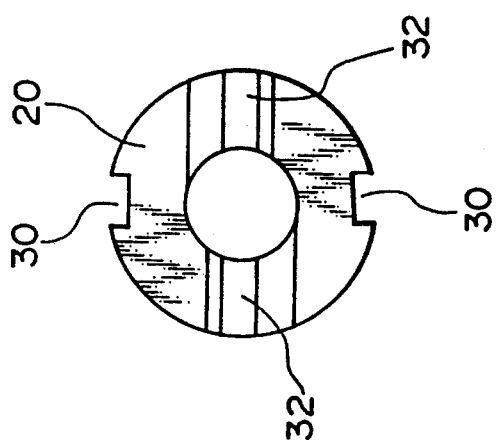
FIG. 5A is a front view of a locking member included in the embodiment.
Figure 5C:
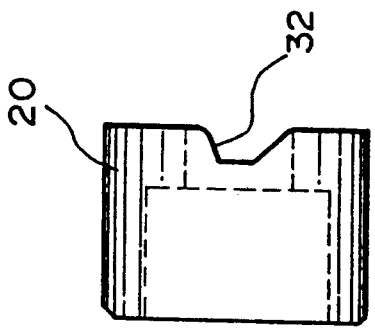

Referring to FIG. 3, the hinge mechanism embodying the present invention has a cylindrical first hinge 14a and a cylindrical second hinge 14b. A pair of guide libs 26 (only one is visible) are provided on the inner periphery of the first hinge 14a and extend in the axial direction of the hinge 14a, Trapezoidal lugs 28 are provided on the end of the second hinge 14b that faces the first hinge 14a. A cylindrical locking member 20 has guide grooves 30 each mating with one of the guide libs 26 on the outer periphery thereof. Also, the locking member 20 has recesses 32 on the end thereof which faces the hinge 14b when the member 20 is inserted into the hinge 14a via a screw 24 and a spring 22. The recesses 32 each mates with one of the lugs 28 of the hinge 14b. FIG. 4A is a front view showing the configuration of the lugs 28 of the hinge 14b in detail. The lugs 28 appear as shown in FIGS. 4B and 4C when seen from opposite sides. FIG. 5A shows the configurations of the recesses 32 and guide grooves 30 of the locking member 20 in detail. FIGS. 5A and 5B are side elevations of the recesses 32 and guide grooves 30 as viewed from opposite sides.

Figure 6:
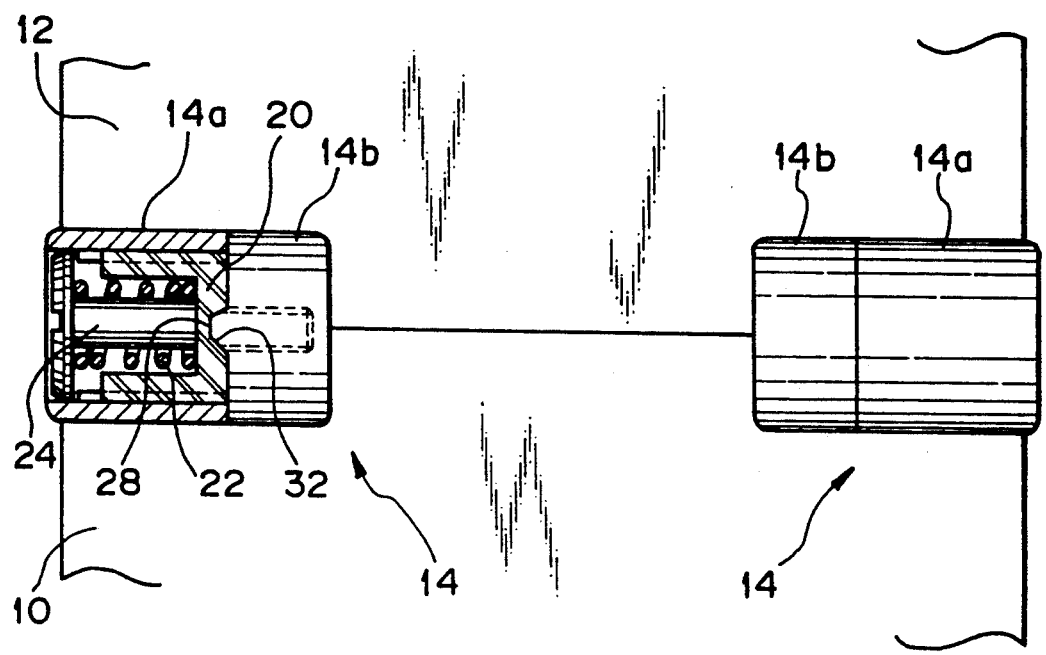
FIG. 6 is a sectional side elevation showing a first hinge and the second hinge in a locking position.
Figure 7:
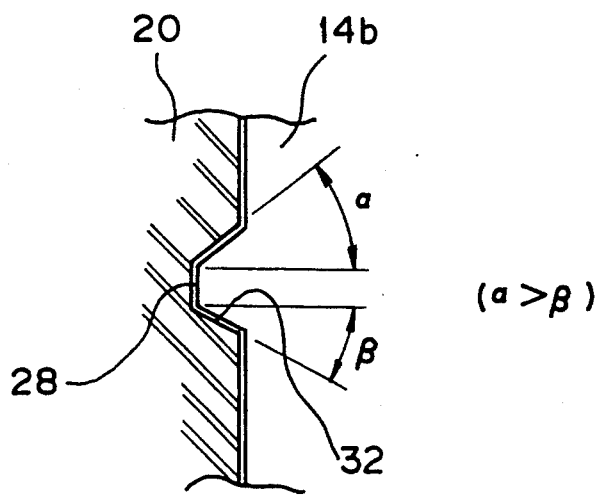
FIG. 7 is a fragmentary enlarged view showing the locking position of the hinge mechanism in more detail.

As shown in FIG. 6, when the recesses 20 of the first hinge 14a and the lugs 28 of the second hinge 14b mate with each other, the hinges 14a and 14b are locked in position. Specifically, the hinges 14a and 14b are locked to each other when the apparatus is unfolded to the angle $\theta$, as shown in FIG. 1. As shown in FIG. 7, in the locked state, each of the recesses 32 of the locking member 20 and the associated lug 28 of the second hinge 14b make contact angles $\alpha$ and $\beta$ which are different from each other. For example, assume that when the two casings 10 and 12 are rotated toward each other, i.e., in the folding direction, the contact angle $\alpha$ holds. Then, if the contact angle $\alpha$ is selected to be greater than or equal to 45 degrees, the casings 10 and 12 can be rotated by a relatively small effort. Assume that the contact angle $\beta$ holds when the casings 10 and 12 are urged further from the ordinary position for use in the unfolding direction. Then, if the contact angle $\beta$ is selected to be smaller than 45 degrees $\beta$ being smaller than $\alpha$), the casings 10 and 12 will be prevented from being unfolded more than the angle $\theta$.

In summary, it will be seen that the present invention provides a hinge mechanism which allows each of the force for folding an electronic apparatus and the force for unfolding it to have a different value. Hence, the apparatus is easy to fold and is not unfoldable beyond the ordinary position for use unless an excessive force is inadvertently exerted thereon. This is successful in promoting easy operation of the apparatus and protecting the apparatus against damage.

Various modifications will become possible for those skilled in the art after receiving the teachings of the present disclosure without departing from the scope thereof.

What is claimed is:

1. A hinge mechanism for rotatably conecting a first and a second casing of a foldable electronic apparatus, comprising:
    first hinge means provided on the first casing and having first engaging means; and
    second hinge means provided on the second casing and having second engaging means mating with said first engaging means of said first hinge means such that the first and second casing are locked in position spaced apart by a predetermined angle from each other;
    said second engaging means mating with said first engaging means in a condition which differs from one direction of rotating to the other direction of rotation of the first and second casing;
    said first hinge means including a cylindrical hinge member and a locking member received in said hinge member, said second hinge means including a cylindrical hinge member;
    said first engaging means including recesses formed in one end of said locking member which faces said cylindrical hinge member of said second hinge means, said second engaging means including lugs formed on one end of said cylindrical hinge member thereof which faces said one end of said locking member and each mating with one of said recesses of said locking member, wherein said lugs of said second engaging means each contacts one of said recesses of said first engaging means at a contact angle which differs from one direction of rotation to the other direction of rotation of the first and second casings.

2. A hinge mechanism as claimed in claim 1, wherein the contact angle, when the first and second casings are rotated in a folding direction, is greater than or equal to 45 degrees while, the contact angle, when said first and second casings are rotated in an unfolding direction, is smaller than 45 degrees.

* * * * *